Patented July 2, 1935

2,006,981

UNITED STATES PATENT OFFICE 2,006,981

PRODUCTION OF HYDROCYANIC ACID

Leonid Andrussow, Mannheim, Germany, assignor to I. G. Farbenindustrie Aktiengesellschaft, Frankfort-on-the-Main, Germany No Drawing. Application November 25, 1932, Serial No. 644,273. In Germany December 14, 1931

10 Claims. (Cl. 23—151)

The present invention relates to the production of hydrocyanic acid.

In my copending application Ser. No. 528,239, filed April 6, 1931, which has matured into U. S. P. 1,934,838 I have described a process for the production of hydrocyanic acid, which comprises passing a gaseous mixture containing ammonia and at least one hydrocarbon over a hot oxidation catalyst while carrying out the reaction with a gaseous mixture containing from 0.2 molecular proportion of oxygen for a mixture of 1 molecular proportion each of ammonia and of hydrocarbon up to about 1 molecular proportion of oxygen per each carbon atom of said hydrocarbon plus 0.25 molecular proportion of oxygen for each atomic proportion of hydrogen present in hydrocarbon and ammonia. In this process the oxygen is added in the stated proportions to partially burn the ammonia and hydrocarbon in order to render the strongly endothermic reaction exothermic.

I have now found that hydrocyanic acid can be also obtained with advantage by replacing the hydrocarbons employed as initial materials in the process of my said copending application wholly or partially by one or more volatile hydrocarbon compounds in which at least one hydrogen atom is substituted by an atom other than nitrogen, or by a group containing such atom, and which contain at least one hydrogen atom, as for example alcohols, ethers, aldehydes, phenols, carboxylic acids, esters, incompletely halogenated hydrocarbons or acid halides and even sulphides and phosphides. The term volatile is meant to define bodies which are volatile under the conditions of working or which are at least decomposed into volatile compounds. Generally, compounds containing up to 8 carbon atoms are preferred owing to their volatility and consequent simple working. For the sake of brevity, the aforesaid hydrocarbon compounds will be referred to in the following and in the appended claims as volatile hydrocarbon derivatives. Specific examples of such hydrocarbon derivatives are methyl, ethyl and propyl alcohols, vinyl alcohol, formaldehyde, acetaldehyde and acroleine, acetic, propionic, butyric, acrylic, and benzoic acids, dimethyl and diethyl ethers, methyl formate and acetate, ethyl acetate, mono- di- and tri-halogen methane, ethane or ethylene, vinyl chloride and phenols and diphenyl ether. Nitrogen-bearing derivatives of hydrocarbons are not employed in the present process as essential initial materials since the reaction proceeds with these materials in another manner as has been described in another specification, carbon and nitrogen being present in the uncombined state with each other in the initial materials of the present process. Waste gases or by-products containing the said derivatives together with hydrocarbons may advantageously be employed as initial materials, for example waste gases and by-products obtained from the clorination of hydrocarbon mixtures, such as cracking gases, or, if desired, from the subsequent saponification of the chlorine compounds, as for example, the undesired di- and tri-halogen compounds occuring in the production of mono-halogen compounds.

The reactions taking place during the conversion may be represented, for example, by the following equations:

$$C_2H_5OH + 2NH_3 + 2O_2 = 2HCN + 5H_2O$$
$$CHCl=CHCl + 2NH_3 + O_2 = 2HCN + 2HCl + 2H_2O$$

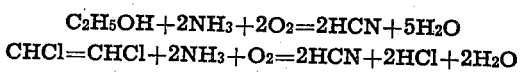

The catalysts may be chosen from oxidation catalysts infusible at the temperatures of working. Thus, for example, the noble metals, such as platinum, iridium, rhodium, palladium, osmium, gold, or silver may be employed as such or in the form of alloys with each other or with other metals. Other metals may also be employed, as for example those of the rare earths, lanthanum, thorium, aluminium, iron, tin, zinc, cadmium, bismuth uranium which base metals are employed in the form of their difficultly fusible compounds, such as simple oxides or phosphates or in the form of mixed phosphates, such as cerium-bismuth phosphates, uranium-tin phosphates or cerium-tin phosphates. The noble metal catalysts may be employed as such and usually in the form of nets or like structures, the base metal catalysts being preferably deposited in the form of their difficultly fusible compounds on a heat resisting carrier, such as silica gel or a gel of a metal oxide, such as alumina. Since some of these catalysts as for example metals of the iron group may be attacked by halogen or hydrogen halides when halogen derivatives, or mixtures containing the same, are employed as initial materials, and the resulting metal halides may be easily sublimated from the catalysts, catalysts are preferably used, which are not or only slightly attacked by halogen or hydrogen halides, as metals of the platinum group are only slightly attacked by hydrogen halides at the higher temperatures coming into consideration, the said metals are preferred in the case of working with halogen derivatives.

The catalysts often yield maximum values only after some working therewith. Otherwise the reaction conditions are the same as described in the said copending application, the reaction temperatures being between 500° and 1300° C. preferably between about 700° and about 1200° C., and the quantities of oxygen to be employed in order to render the endothermic reaction exothermic are only slightly modified. In the process according to my prior copending application the quantity of oxygen employed must be at least 0.2 molecular proportion for a mixture of 1 molecular proportion each of hydrocarbon and of ammonia, but it must be less than would be necessary for the complete combustion of the ammonia and hydrocarbon to NO and $CO_2$. Appropriate amounts of oxygen therefore range between 0.2 molecular proportion of oxygen for a mixture of 1 molecular proportion each of ammonia and of hydrocarbon as the lower limit and about 1 molecular proportion of oxygen per each carbon atom of said hydrocarbon plus 0.25 molecular proportion of oxygen for each atomic proportion of hydrogen present both in hydrocarbon and ammonia. Depending on the quantity of oxygen employed lower or higher yields of hydrocyanic acid are obtained the yields increasing with the quantity of oxygen employed up to a certain optimum.

In the present case the quantity of oxygen employed is about the same but the quantities stated with reference to the said limits may be reduced by subtracting from the resulting sums 0.5 molecular proportion of oxygen for each atomic proportion of halogen, oxygen, sulphur or phosphorus present in the "hydrocarbon derivatives". The amount to be employed of ammonia and oxygen, or air, should generally correspond to the stoichiometrical proportions also in the present case and as a simple rule to be applied, so much oxygen may be present as is necessary to take away all hydrogen and other elements from the hydrocarbon derivatives as well as the ammonia except one hydrogen atom, leaving one atom each of hydrogen, carbon and nitrogen. Ammonia, or the hydrocarbon derivatives, may, however, also be employed in excess to the stoichiometrical ratio, whereby the excess may serve as diluent. It is necessary, however, that in order to avoid explosions, the gas mixtures have such a composition as does not approach the known limits of explosion. For this purpose, inert gases may be added, for example nitrogen or nitrogen-bearing combustion waste gases or, simply, a portion of the waste gas rich in nitrogen, which is obtained in carrying out the present process with the aid of air. Generally, the derivatives of aliphatic hydrocarbons furnish better yields than aromatic hydrocarbon derivatives, the resulting hydrocyanic acid, or a cyanide prepared therefrom, being purer. Though carboxylic acids or halides thereof and even sulphides and phosphides can be converted into hydrocyanic acid without difficulty by means of the process according to the present invention these initial materials will find much less application than alcohols, aldehydes, phenols or halogen derivatives of hydrocarbons which are often obtained as by- or waste products and are therefore much cheaper and more readily available. In comparison to the process described in my said prior copending application the present process is usually carried out with initial materials which are liquid at room temperature, so that the process can be carried out with transportable apparatus and initial materials in any place where hydrocyanic acid is required, as for example in combating pests; whereas any prior process was mainly designed for working with gases and stationary apparatus. A particular improvement over my prior process by the present invention exists in the possibility of replacing a portion of the hydrocarbons in a gas mixture containing hydrocarbons, ammonia and oxygen and serving for the production of hydrocyanic acid, by incompletely halogenated hydrocarbons so that the hydrogen halide set free during the conversion combines with unconverted ammonia to form ammounium halide and free hydrocyanic acid may easily be obtained in a pure state. This manner of working is very economical, especially if cheap chlorinated hydrocarbon mixtures or waste products resulting from the chlorination of hydrocarbons be available.

The following examples will further illustrate the nature of the present invention, which however, is not restricted thereto.

*Example 1*

500 liters of air, saturated with vapours of methyl alcohol at 27° C., together with 100 liters of ammonia are passed per hour at from 820° to 850° C. through 80 square centimeters of a netting consisting of two superimposed, fine-meshed wire nettings (1024 meshes per square centimeter, diameter of the wire=0.06 millimeter) consisting of platinum containing 10 per cent by weight of rhodium. From 52 to 55 per cent of the initial ammonia is converted into hydrocyanic acid; only slight losses of ammonia occur by a formation of nitrogen.

*Example 2*

900 liters of a mixture consisting of 15.8 per cent (by volume) of ammonia, 7.5 per cent of ethyl alcohol, 15.4 per cent of oxygen and 61.3 per cent of nitrogen yield per hour with each 100 square centimeters of the catalyst as described in Example 1, at from 850° to 900° C., 48 per cent (by volume) of the theoretical yield of hydrocyanic acid calculated with reference to the ammonia employed.

When adding from 5 to 6 per cent of methane to the initial mixture, up to two thirds of the ammonia can be converted into hydrocyanic acid.

In the same manner an initial mixture consisting of 15.8 parts of ammonia, 7.5 parts of acetaldehyde, 13.9 parts of oxygen and 55.3 parts of nitrogen may be employed.

*Example 3*

2000 parts of air, saturated with dichlorethane at from 52° to 55° C., together with 560 parts of ammonia are passed per hour and at a temperature of about 900° C. over 1 part of a catalyst consisting of titanium dioxide and kaolin in the proportion by weight of 1 to 1. From 85 to 87 per cent of hydrocyanic acid, calculated with reference to the ammonia consumed, and from 15 to 13 per cent of nitrogen are formed. When employing a catalyst consisting of zirconium dioxide and kieselguhr similar yields are obtained.

*Example 4*

30 parts by volume of ammonia, 220 parts of air and 25 parts of methane together with 6 parts of a gaseous mixture consisting of about 10 per cent of monochlorethane, 42 per cent of dichlorethane, 8 per cent of trichlorethane and 40 per cent of dichlorethylene are passed at a velocity of 1080 liters per hour through each 100 square centimeters of a double wire-netting consisting of a platinum-rhodium alloy at a temperature of from 950° to 1000° C. and a velocity of 30 centimeters per second. About two thirds of the ammonia employed is converted into hydrocyanic acid giving a yield of more than 90 per cent calculated on ammonia consumed. The hot reaction gases are led into a trickling tower, in which the ammonium chloride formed is washed out with water. The mist of ammonium chloride occurring, if any, may be separated by any known electric system for depositing dust from gases so that any clogging of pipes by ammonium chloride is avoided. Since the quantity of hydrochloric acid formed during the reaction is sufficient for combining with the unconverted ammonia, free hydrocyanic acid may be separated from the gas mixture without any difficulty.

What I claim is:—

1. In the production of hydrocyanic acid by passing a gaseous mixture containing ammonia and at least one volatile organic compound over a hot oxidation catalyst, the step which comprises carrying out the reaction with a gaseous mixture containing ammonia, oxygen and a volatile hydrocarbon derivative free from nitrogen but containing at least one hydrogen atom and in which at least one hydrogen atom is substituted by an atom other than hydrogen and nitrogen said mixture containing from 0.2 molecular proportion of oxygen for a mixture of 1 molecular proportion each of ammonia and of said volatile hydrocarbon derivative free from nitrogen to about 1 molecular proportion of oxygen per each carbon atom of said hydrocarbon derivative plus 0.25 molecular proportion of oxygen for each atomic proportion of hydrogen present in said hydrocarbon derivative and ammonia, while subtracting from the resulting sums 0.5 molecular proportion of oxygen for each atomic proportion of any halogen, oxygen, sulphur and phosphorus present in said hydrocarbon derivative.

2. In the process as claimed in claim 1, working at a temperature between 500° and 1300° C.

3. In the process as claimed in claim 1, working at a temperature between about 700° and about 1200° C.

4. In the production of hydrocyanic acid by passing a gaseous mixture containing ammonia and at least one volatile organic compound over a hot oxidation catalyst between about 700° and about 1200° C., the step which comprises carrying out the reaction with a gaseous mixture containing ammonia, oxygen, a volatile hydrocarbon derivative free from nitrogen but containing at least one hydrogen atom and in which at least one hydrogen atom is substituted by an atom other than hydrogen and nitrogen and a volatile hydrocarbon, said mixture containing from 0.2 molecular proportion of oxygen for a mixture of 1 molecular proportion each of ammonia, of said volatile hydrocarbon derivative and said volatile hydrocarbon to about 1 molecular proportion of oxygen per each carbon atom of said hydrocarbon derivative and said hydrocarbon plus 0.25 molecular proportion of oxygen for each atomic proportion of hydrogen present in said hydrocarbon derivative, hydrocarbon and ammonia, while subtracting from the resulting sums 0.5 molecular proportion of oxygen for each atomic proportion of any halogen, oxygen, sulphur and phosphorus present in said hydrocarbon derivative.

5. In the production of hydrocyanic acid by passing a gaseous mixture containing ammonia and at least one volatile organic compound over a hot oxidation catalyst between 700° and 1200° C., the step which comprises carrying out the reaction with a gaseous mixture containing ammonia, oxygen and a volatile, hydrogen- and oxygen-bearing derivative of a hydrocarbon free from nitrogen, said mixture containing from 0.2 molecular proportion of oxygen for a mixture of 1 molecular proportion each of ammonia and of said hydrocarbon derivative to about 1 molecular proportion of oxygen per each carbon atom of said hydrocarbon derivative plus 0.25 molecular proportion of oxygen for each atomic proportion of hydrogen present in said hydrocarbon derivative and ammonia, while subtracting from the resulting sums 0.5 molecular proportion of oxygen for each atomic proportion of any oxygen, halogen, sulphur and phosphorus present in said hydrocarbon derivative.

6. In the production of hydrocyanic acid by passing a gaseous mixture containing ammonia and at least one volatile organic compound over a hot oxidation catalyst between 700° and 1200° C., the step which comprises carrying out the reaction with a gaseous mixture containing ammonia, oxygen and a volatile, hydrogen- and halogen-bearing derivative of a hydrocarbon free from nitrogen, said mixture containing from 0.2 molecular proportion of oxygen for a mixture of 1 molecular proportion each of ammonia and of said hydrocarbon derivative to about 1 molecular proportion of oxygen per each carbon atom of said hydrocarbon derivative plus 0.25 molecular proportion of oxygen for each atomic proportion of hydrogen present in said hydrocarbon derivative and ammonia, while subtracting from the resulting sums 0.5 molecular proportion of oxygen for each atomic proportion of any halogen, oxygen, sulphur and phosphorus present in said hydrocarbon derivative.

7. In the production of hydrocyanic acid by passing a gaseous mixture containing ammonia and at least one volatile organic compound over a hot oxidation catalyst between 700° and 1200° C., the step which comprises carrying out the reaction with a gaseous mixture containing ammonia, oxygen, a volatile, hydrogen- and halogen-bearing derivative of a hydrocarbon free from nitrogen and a volatile hydrocarbon, said mixture containing from 0.2 molecular proportion of oxygen for a mixture of 1 molecular proportion each of ammonia and of said hydrocarbon and hydrocarbon derivative to about 1 molecular proportion of oxygen per each carbon atom of said hydrocarbon and hydrocarbon derivative plus 0.25 molecular proportion of oxygen for each atomic proportion of hydrogen present in said hydrocarbon, hydrocarbon derivative and ammonia, while subtracting from the resulting sums 0.5 molecular proportions of oxygen for each atomic proportion of any halogen, oxygen, sulphur and phosphorous present in said hydrocarbon derivative.

8. In the production of hydrocyanic acid by passing a gaseous mixture containing ammonia and at least one volatile organic compound over a hot oxidation catalyst at from about 820° to about 850° C. the step which comprises carrying out the reaction with a gaseous mixture containing ammonia, oxygen and methanol said mixture containing so much oxygen as to make the reaction exothermic but less than would lead to complete combustion to carbon monoxide and nitrogen.

9. In the production of hydrocyanic acid by passing a gaseous mixture containing ammonia and at least one volatile organic compound over a hot oxidation catalyst at from about 850° C. to about 900° C. the step which comprises carrying out the reaction with a gaseous mixture containing ammonia, oxygen and ethyl alcohol said mixture containing so much oxygen as to make the reaction exothermic but less than would lead to complete combustion to carbon monoxide and nitrogen.

10. In the production of hydrocyanic acid by passing a gaseous mixture containing ammonia and at least one volatile organic compound over a hot oxidation catalyst at from about 950° to about 1000° C. the step which comprises carrying out the reaction with a gaseous mixture containing amomnia, oxygen, methane and a mixture of different chlorination derivatives of ethane and ethylene containing at least one hydrogen atom, said mixture containing from 0.2 molecular proportion of oxygen for a mixture of 1 molecular proportion each of ammonia and of said hydrocarbon and chlorinated hydrocarbons to about 1 molecular proportion of oxygen per each carbon atom of said hydrocarbon derivative plus 0.25 molecular proportion of oxygen for each atomic proportion of hydrogen present in said hydrocarbon derivative and ammonia, while subtracting from the resulting sums 0.5 molecular proportion of oxygen for each atomic proportion of any chlorine present in said hydrocarbon derivatives.

LEONID ANDRUSSOW.